June 2, 1925.
R. T. HUGO ET AL
1,540,073
PORTABLE STOVE
Filed June 11, 1923     5 Sheets-Sheet 1
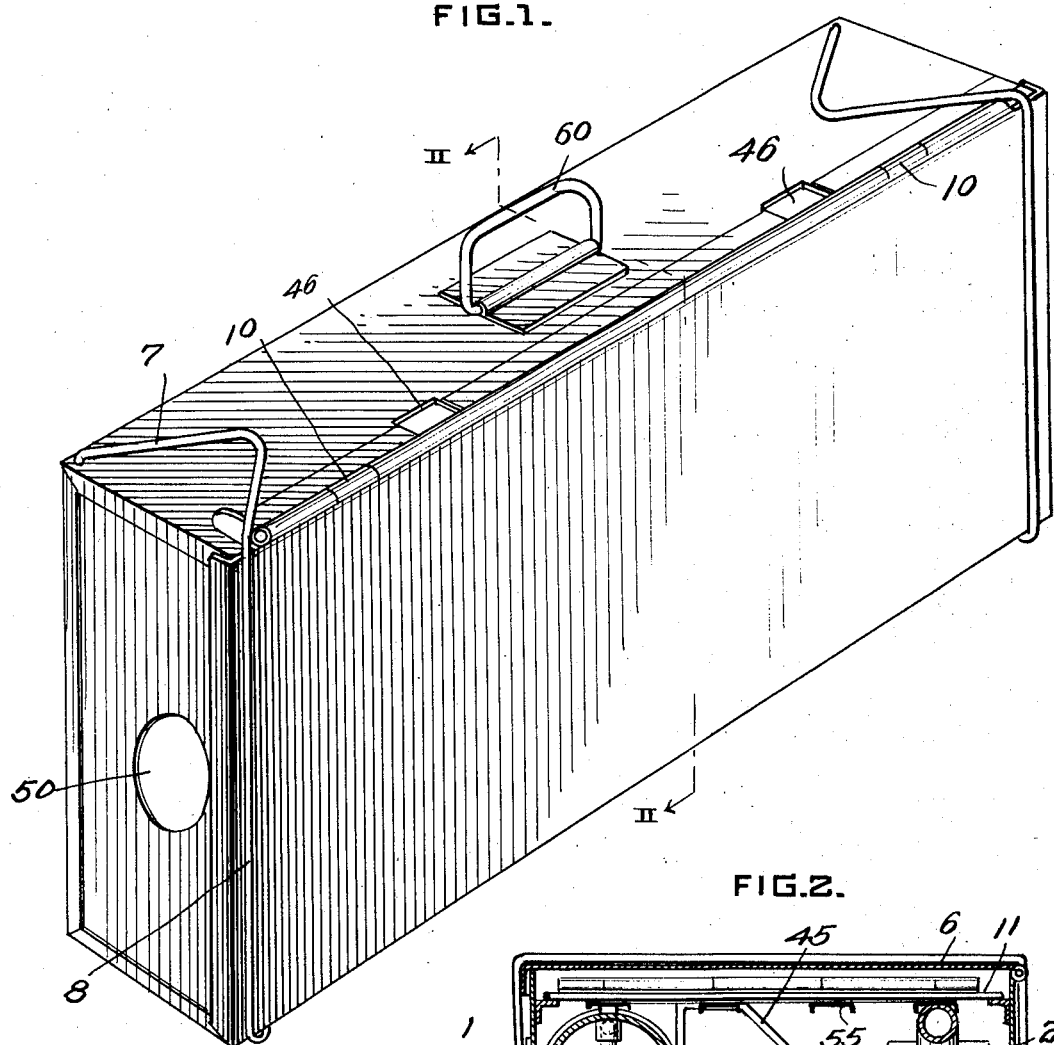
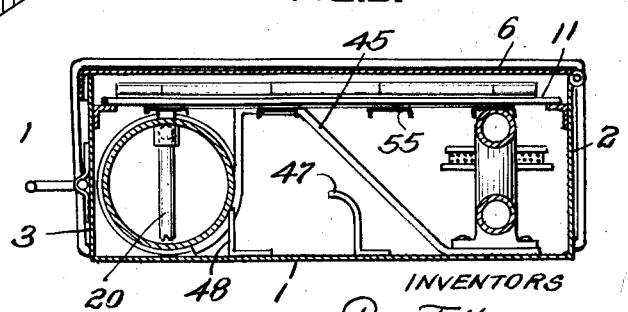

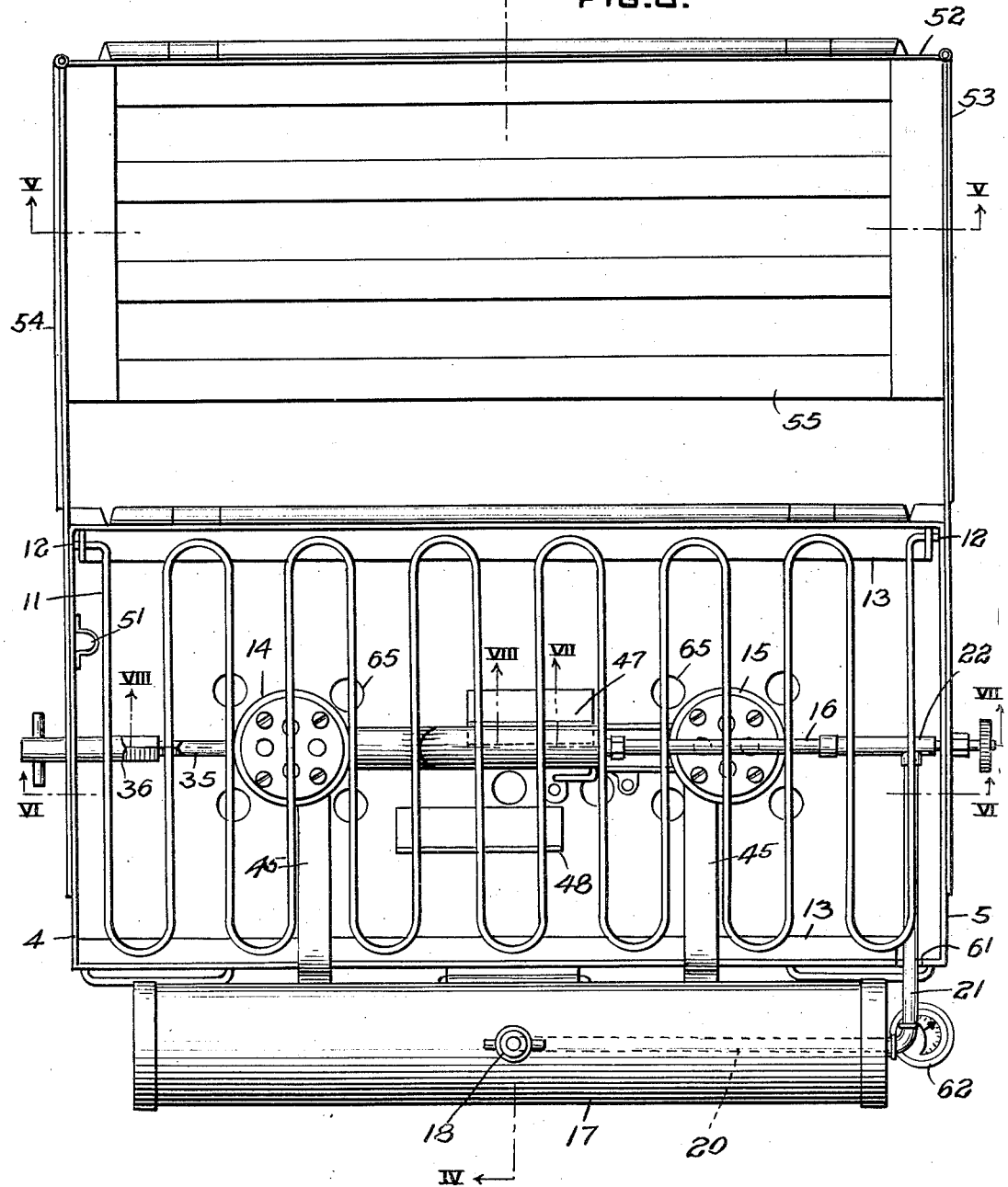

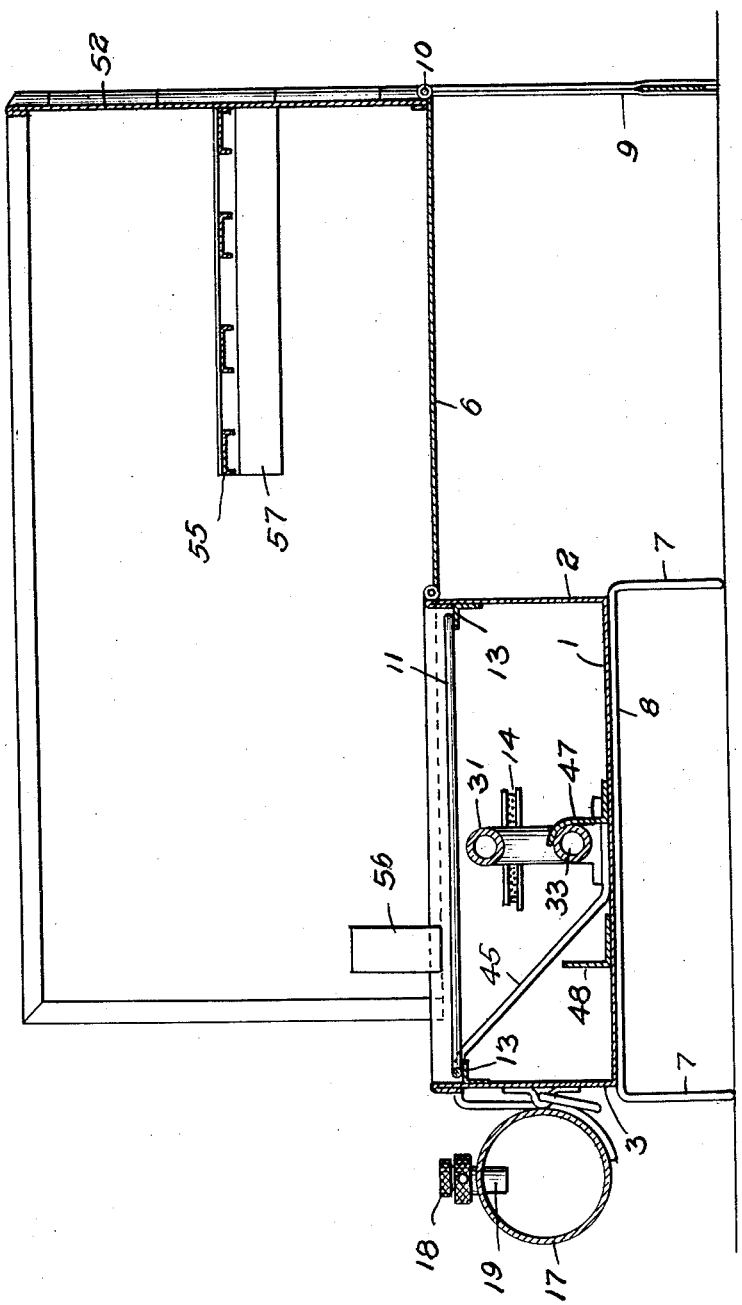

June 2, 1925.

R. T. HUGO ET AL 1,540,073

PORTABLE STOVE

Filed June 11, 1923

5 Sheets-Sheet 4

WITNESSES

INVENTORS

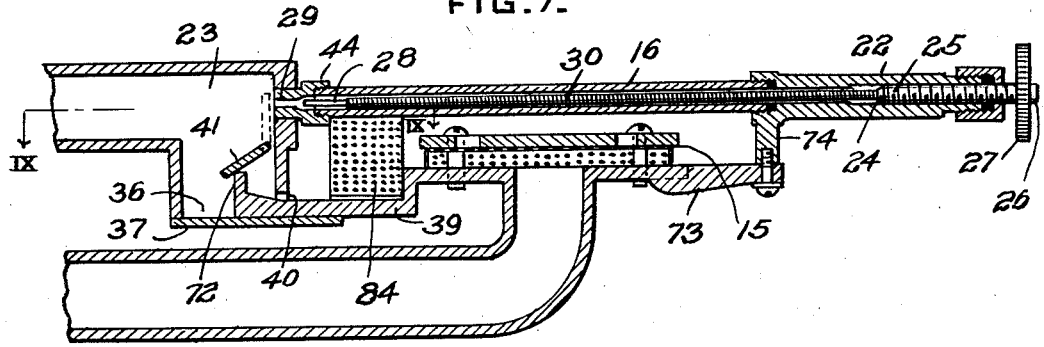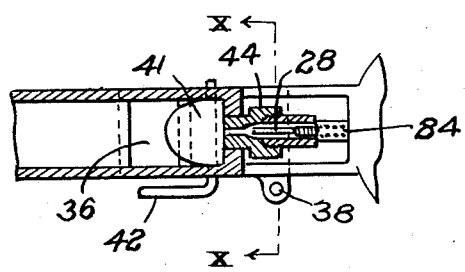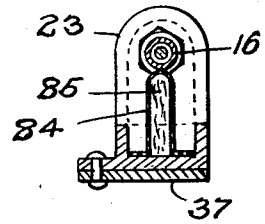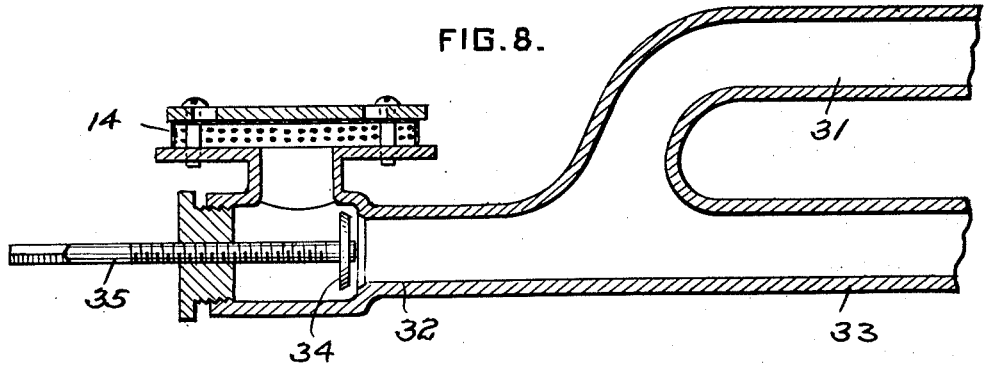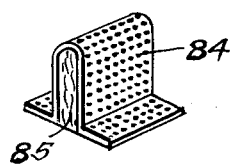

Patented June 2, 1925.

1,540,073

UNITED STATES PATENT OFFICE.

RENE T. HUGO AND FRED G. KLINERT, OF DULUTH, MINNESOTA, ASSIGNORS TO HUGO MANUFACTURING COMPANY, OF WEST DULUTH, MINNESOTA, A CORPORATION OF MINNESOTA.

PORTABLE STOVE.

Application filed June 11, 1923. Serial No. 644,537.

*To all whom it may concern:*

Be it known that we, RENE T. HUGO and FRED G. KLINERT, citizens of the United States, and residents of Duluth, in the county of St. Louis and State of Minnesota, have invented a new and useful Improvement in Portable Stoves, of which the following is a specification.

The invention relates to portable vapor-burning stoves of the general type in which liquid fuel, such as gasoline, is vaporized in a generator subjected to the heat of the stove burner or jet. While unlimited to any specific uses, the invention is particularly applicable to stoves for campers, street venders, and others requiring stoves which may be readily packed in convenient and safe form for transportation, and may be quickly set up for use.

The object of the invention is, generally stated, to improve the construction and operation of portable stoves of the type stated.

A more specific object is to provide a portable stove with a single means for supporting it when in use and for locking its casing when not in use.

A further specific object is to provide a stove in which the casing is constructed to receive and retain a movable unitary burner and tank structure in alternate positions, one position being when the stove is in use and the other when not in use.

Other objects will appear from the description of the invention.

Figure 5:
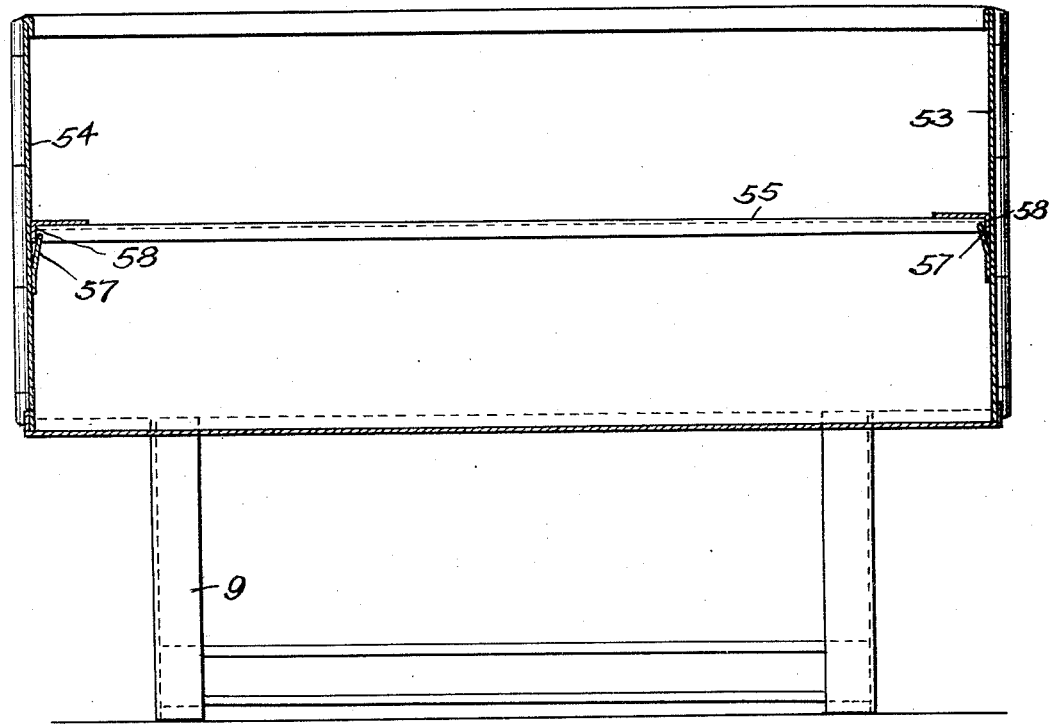
Figure 6:
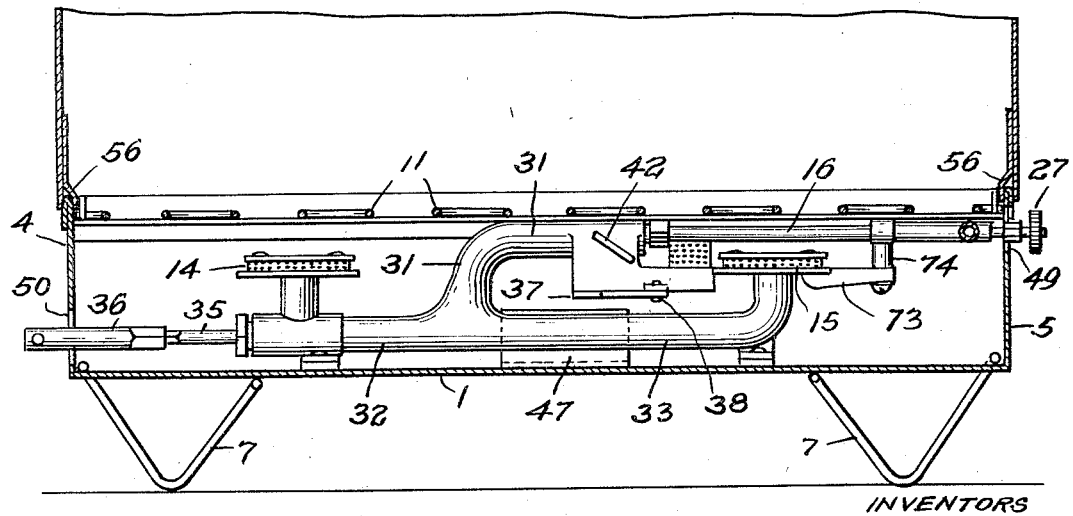

The invention is illustrated in the accompanying drawings of which Fig. 1 is a perspective view of the stove when not in use, or in other words when arranged for transportation; Fig. 2 a vertical sectional view taken substantially on the line II—II, Fig. 1; Fig. 3 a plan view of the stove when set up for use; Figs. 4, 5 and 6 sectional views of the complete stove when set up for use, the planes of view being indicated, respectively, by the lines IV—IV, V—V, and VI—VI, Fig. 3; Figs. 7 and 8 vertical sectional views to enlarged scale of the burner and vapor generator, the planes of view being indicated, respectively, by the lines VII—VII, and VIII—VIII, Fig. 3; Fig. 9 a horizontal sectional view taken on the line IX—IX, Fig. 7; Fig. 10 a vertical sectional view taken on the line X—X, Fig. 9; and Fig. 11 a perspective view of a priming wick and baffle.

The portable stove provided according to this invention includes a casing constructed to receive and properly hold a vapor burner and its essential accessory elements, including a fuel tank and generator, both when the stove is in use and when arranged for transportation. The casing includes a cover or lid, and is provided with a single means for locking the lid when the stove is not in use and for supporting the stove when set up for use. While as far as some features of the invention are concerned the burner and its essential accessory parts may be variously arranged, it is preferred to connect the burner, vapor generator and fuel supply tank into a unitary structure which is movable as a whole from a position in which the burner generator and tank lie entirely within the casing when the stove is not in use to a position in which the tank lies outside of the casing and is protected by a wall thereof when the stove is in use. For thus receiving and retaining the unitary structure in its alternate positions and for rendering its operating or controlling members accessible when the stove is in use, the casing is provided with suitable lugs and openings, which, together with other features of construction will presently be explained in detail. The stove also includes a foldable combined warming oven and wind shield so constructed as to be carried within the casing when the stove is not in use and to be supported by the casing when in use.

Having reference to the drawings, the stove casing is preferably in the form, and may be of the usual size of an ordinary suit case. It may be constructed of sheet metal having a baked enamel coating, and includes a bottom 1, sides 2 and 3, ends 4 and 5, and a lid 6 preferably hinged to the upper edge of side 2. The lid-locking and stove-supporting members mentioned above are preferably pivotally attached to the ends 4 and 5 of the casing. As seen particularly in Figs. 1, 4 and 6, these members may each be formed of a single strip of resilient metal bent at its ends to form V-shaped legs 7 between which there is a transverse intermediate section 8. The extreme ends of the V-shaped portions are turned laterally to form pintles for pivoting these members to the lower outer portions of sides 2 and 3.

When the stove is in use, the combined locking and supporting members are swung to the positions indicated in Figs. 4 and 6 in which their transverse sections 8 bear against the lower face of casing bottom 1 and their V-shaped portions 7 extend downwardly to support the casing above the ground or other resting place. When the stove is arranged for transportation these members are swung to the position indicated in Fig. 1 in which the transverse sections 8 lie above lid 6 and hold or lock it in closed position. The V-shaped portions of these members serve both to afford a rigid support for the stove and to permit the transverse portions 8 to be snapped over the ends of the lid when the casing is closed, it being understood with respect to the latter that the combined supporting and locking members are preferably formed of metal having sufficient resiliency to permit the V-shaped portions to expand so that transverse portion 8 may be snapped over the lid in the manner stated.

When the stove is in use lid 6 is turned backwardly until it lies substantially in the plane of the open top of the casing. It is supported in this position by means of a frame 9 which is preferably pivoted as at 10 to the outer edge of the lid, the arrangement being such that when the casing is closed the supporting frame 9 may be just inside the lid. In the upper portion of the casing there is a grid 11 for supporting cooking utensils or other articles being heated, the grid preferably being pivoted as at 12 to a lug attached to the casing so that it may be swung upwardly for access to the burner and its attached parts. In its normal position the grid may be supported intermediate of its ends by means of suitable ledges 13 attached to the sides of the casing.

As is usual in stoves of the character contemplated by this invention, the stove includes one or more burner jets, a vapor generator and a fuel supply tank, and, as previously indicated, these several elements are preferably united into a unitary structure movable from one to another position. In the present embodiment of the invention there are two burner jets 14 and 15, a single vapor generating tube 16 arranged above jet 15, and a single fuel supply tank 17. The construction of these elements will first be explained, and thereafter the manner in which they are united into a unitary structure, and the construction of the casing for receiving and retaining the unit structure in its alternate positions.

The tank is provided with a suitable fill-plug 18, depending from which there is a sleeve 19 for the purpose of entrapping air above the lower edge of the sleeve so that liquid fuel such as gasoline will not completely fill the tank. It is desirable to have such an air space to facilitate the application of the pressure to the liquid fuel in the tank to cause the fuel to flow to the vapor generator. A fluid discharge tube 20, serrated or otherwise formed at its bottom so that its inlet will not be closed by the bottom of the tank, extends preferably from a position substantially at the center of tank 17 through its end and is connected to a pipe 21 which in turn is connected to a valve casing 22 attached to vapor-generating tube 16.

For controlling flow of liquid to and through tube 16, valve casing 22 is provided with a valve seat 24 adapted to be closed by a valve 25 attached to a stem 26 having an operating member 27. A needle 28 is attached to the end of valve stem 26 and extends through tube 16, the arrangement being such that when the valve is closed the needle extends through an orifice 29 which connects tube 16 to a mixing chamber 23. By turning valve operating member 27 the end of the needle may be used to remove any carbon or sediment which may collect in orifice 29. A wire 30 may be wrapped around needle 28 to facilitate the generation of vapor and the cleaning of the generating tube.

Mixing chamber 23 is connected by a pipe 31 to pipes 32 and 33 leading to burner jets 14 and 15, respectively. Flow of vapor to jet 14 may be controlled by a valve 34 provided with a stem 35 having an angular head adapted to be received by an operating key 36. The lower end of the mixing chamber is provided with an air inlet port 36 through which flow of air in properly regulated quantity may be controlled by means of a shutter 37 pivoted as at 38.

Between burner jet 15 and mixing chamber 23 there is a priming cup 39 for receiving a small quantity of liquid fuel which is ignited to initiate the generation of vapor. This cup communicates with the mixing chamber by means of a port 40. Within the mixing chamber there is a pivotally mounted baffle 41 adapted to be turned by means of an arm 42 from the position in which it is indicated in full lines in Fig. 7 to its dotted line position, in the latter of which it causes liquid fuel flowing through orifice 29 to pass downwardly in the mixing chamber and through port 40 into priming cup 39. There is also a wall 72 projecting upwardly from the bottom of the mixing chamber to direct the flow of liquid fuel to the priming cup in the manner stated. The priming cup is provided with a wick for conducting the priming flame close to the generating tube, and with a baffle for preventing the flame from being blown to a side of the tube. Preferably the wick and baffle are combined in a single structure, which, as illustrated in Fig. 11, may comprise a wick 85 of asbestos or other suitable material arranged between a perforate metal plate 84 of inverted U-shape having outstanding supporting flanges at its lower edges. As seen particularly in Figs. 7 and 10, this structure rests upon the bottom of priming cup 39 and extends upwardly to generating tube 16.

Having reference now to the manner in which the burner, generator and tank are connected to each other, and the construction of the casing for receiving and retaining the unitary structure in its alternate positions, fuel supply tank 17 and the burner are preferably rigidly connected to each other by means of a pair of upwardly turned straps 45 including upper horizontal portions, which, when the stove is set up for use, rest in recesses 46 (Fig. 1) formed in the upper edge of casing side 3, and prevent sidewise movements of the unitary structure. Generating tube 16 may be rigidly connected at one end to mixing chamber 23 by a spud 44, and at its other end to valve casing 22 which in turn is rigidly attached to burner jet 15 by brackets 73 and 74 (Fig. 7). In addition to these connections for forming the unitary structure mentioned above, pipe 21 rigidly connects tank 17 to valve casing 22. An important advantage in rigidly connecting the outlet of vapor generating tube 16 to the mixing chamber is that at all times the stream of vapor issuing from the vapor generator is properly directed straight into the mixing chamber. In other words, jarring or rough handling of the burner or stove will not result in the stream of vapor being projected against a side wall of the mixing chamber with consequent improper combustion at the burner jets.

The casing is also provided with means in addition to recesses 46 for holding this unitary structure in its alternate positions under the conditions of service. From time to time while the stove is in use it is necessary to increase the pressure on the liquid fuel in tank 17, and this is done by means of a suitable hand pump the operation of which causes a downward thrust upon the top of filling plug 18. To hold the unitary burner and tank structure in its proper position when the stove is set up for use, and particularly while the pressure pump is being operated in the manner stated, the bottom of the casing is provided with a lug 47 which overhangs burner pipe 33 and resists the tendency of the burner to rise. To hold the unitary burner structure against movement within the casing when the stove is arranged for transportation the bottom of the casing is further provided with a lug 48 between which and side 3 of the casing fuel tank 17 may lie. When the casing lid is closed the parts between it and the top of the fuel tank cooperate with side 3 of the casing and lug 48 to firmly hold the fuel tank against movement, and in consequence thereof the entire unitary structure is held immovable when the stove is arranged for transportation.

That the flow of fuel to burner jets 14 and 15 may be controlled from the outside of the casing when the stove is in use, end 5 of the casing is provided with an opening 49, through which valve stem 26 may extend, valve operating member 27 being then outside of the casing. The opposite end 4 of the casing is also provided with an opening 50 through which key 36 may be inserted to control valve 34. A pocket 51 is provided on the inner face of side 4 to receive key 36 when the stove is arranged for transportation.

As previously stated, the stove preferably includes a combined warming oven and wind shield. This is preferably formed of four members, a back 52, sides 53 and 54 pivoted to the ends of the back, and a tray 55. Sides 53 and 54 are provided on their inner faces with lugs 56 which cooperate with the lower edges of these sides to form slots which receive the upper edges of casing ends 4 and 5. Back 52 of the combined wind shield and warming oven rests directly upon the outer edge of lid 6, as indicated in Fig. 4. The inner faces of sides 53 and 54 are further provided with lugs 57 which cooperate with these sides to form slots adapted to receive downwardly extending flanges 58 formed at the ends of tray 55. Sides 53 and 54 extend over ends 4 and 5 of the casing sufficiently to form a wind shield for burner jets 14 and 15, and in so doing they additionally function to direct heat to tray 55 on which articles which have been cooked may be placed and kept warm.

As to the operation of the invention, when the stove is arranged for tranportation its several parts lie within the casing in the positions indicated in Fig. 2, tray 55 being arranged below grid 11, and the warming oven, with its sides 53 and 54 folded upon its back 52, lying between grid 11 and casing lid 6. The casing is tightly locked in closed position by combined lid-locking and case-supporting members 7, 8, and may be easily carried by a handle 60. To set the stove up for use members 7, 8 are moved from their lid-locking position shown in Fig. 1 to their stove-supporting positions shown in Figs. 4 and 6. Lid 6 is then swung backwardly into position indicated in Fig.

4 in which it is supported by frame 9. The combined warming oven and wind shield may then be removed from the casing, opened out, and mounted upon the upper edges of casing ends 4 and 5 and of lid 6, and warming tray 55 may be placed upon its supports 57. With grid 11 swung upwardly, the unitary burner, generator and fuel tank structure is then moved from the position shown in Fig. 2 to that shown in Figs. 3, 4 and 6, it being understood that in the latter position the structure is moved somewhat to the right of that which it occupies in the former position so that valve operating member 27 may pass through opening 49 of casing end 5 and lie outside of such end. Pipe 33 of the burner structure is engaged by lug 47 of the casing bottom, and connecting straps 45 lie in slots 46 of casing side 3. This side is also provided with a slot 61 to receive fuel supply pipe 21. If it is desired to use burner 14 as well as burner 15, key 36 is removed from its pocket 51 and inserted through opening 50 in casing end 4 to engage the end of valve stem 35.

If the fuel tank 17 is not already supplied with gasoline or other suitable fuel it may be filled through plug 18. Thereafter pressure is applied to the fuel through the filling plug, the pressure being indicated by a gage 62 attached to the head of the fuel tank. To start the burner, baffle 41 is turned upwardly to the position indicated in dotted lines in Fig. 7 and valve 25 is opened to permit a small amount of gasoline to flow through nozzle 29. This gasoline is deflected downwardly in the mixing chamber and through port 40 into the priming cup. The gasoline in the priming cup may then be ignited, and in a short time, approximately a minute, the gasoline in vapor generating tube 16 becomes vaporized. With baffle 41 turned downwardly, the vaporized fuel is projected directly into mixing chamber 23 parallel to the walls thereof and becomes mixed with air flowing through air inlet 36 in proper proportion which may be regulated by shutter 37. The continued vaporization of the liquid fuel in vapor generating tube 16 is effected by the flame from burner jet 15. Secondary air for combustion may enter the casing through openings 65 in casing bottom 1.

The advantages of the portable stove will be fully understood from the foregoing description. When arranged for transportation it is compact in form, and all of its parts lie wholly within the casing so that they cannot become damaged. The stove may be quickly and easily set up for use, and when set up its operation is controlled by members which lie outside of the casing. An important advantage of the movability of the unitary burner generator and fuel tank structure is that it may be entirely removed from the casing so that the latter may be easily cleaned.

According to the provisions of the patent statute, we have described the principle and operation of our invention together with the construction which we now consider to represent the best embodiment of it. However, we desire to have it understood that, within the scope of the appended claims, the invention may be practiced by other forms of construction than that particularly shown and described.

No claim is made herein to the novel features of construction of the burner, these being claimed in another application filed of even date herewith.

We claim as our invention:

1. A portable stove comprising a casing having a bottom, side and end walls and a lid; a burner, vapor generator and fuel tank rigidly inter-connected to form a unitary structure movable as a unit from a position in which it lies wholly within the casing to a position in which the burner and vapor generator lie wholly within and below the plane of the upper edges of said casing walls and the fuel tank lies outside of the casing, the casing being provided with means for securely holding said unitary structure in its said alternate positions.

2. A portable stove comprising a casing having a bottom, side and end walls and a lid; a burner, fuel tank and vapor generator, a pipe connecting the fuel tank with the vapor generator, and a valve provided with an operating member for controlling flow through the pipe, all connected to each other to form a unitary rigid structure; said structure being movable as a unit from a position in which it lies wholly within the casing to a position in which the fuel tank and valve operating member lie outside of the casing and the remainder of said structure lies wholly within the casing and below the plane of the upper edges of said casing walls, the casing being provided with means for securely holding said unitary structure in said alternate positions.

3. A portable stove comprising a casing having a bottom, side and end walls and a lid, a vapor-generating burner, a fuel tank, upwardly turned straps rigidly connecting said burner with said tank, a pipe connecting said burner with said tank, and provided with a valve having an operating member for controlling flow through the pipe, said burner, tank and pipe being movable as a unit from a position in which it lies wholly within the casing to a position in which the burner lies within and the tank and valve operating member lie outside of the casing, the bottom of said casing being provided with lugs to hold said unit structure in its said alternate positions, a side of the casing being provided with notches to receive said straps when the tank lies outside of the casing, and an end of the casing being provided with an opening through which said valve operating member extends when the valve operating member lies outside of the casing.

4. A portable stove comprising a casing having a bottom, side and end walls and a lid, a two-jet vapor-generating burner and a fuel tank rigidly connected to each other to form a unitary structure movable as a unit from a position in which said burner and tank lie wholly within the casing to a position in which the burner lies wholly within and below the plane of the upper edges of said casing walls and the tank lies outside of the casing, means for securely holding said structure in its alternate positions, valves and valve operating members for controlling flow to said two burner jets, and openings in the ends of said casing through which said valve operating members extend when said structure is in said position in which the tank lies outside of the casing.

5. A portable stove comprising a casing having a bottom, side and end walls and a lid hinged to the one side wall, a burner arranged within and supported by the casing, a supporting member pivoted to the outer edge of said lid and adapted to support the lid in a plane with the upper edges of said casing ends and sides when the lid is moved to open position, and a combined wind shield and warming oven resting upon the lid when in open position and comprising a back and sides hinged to the ends of the back, and a warming rack detachably supported by the wind shield sides.

6. A portable stove comprising a casing having a bottom, side and end walls and a lid, a fuel tank, a vapor generating burner, upwardly turned straps connecting the base of the burner with the fuel tank to form a unitary structure movable as a unit from a position in which both the burner and tank lie wholly within the casing to a position in which the burner lies wholly within and the tank outside of the casing with the upturned portions of the straps resting on an edge of a wall of the casing, and lugs attached to and extending upwardly from the bottom of the casing for engaging elements of said unitary structure in its said alternate positions.

7. A portable stove comprising a casing having a bottom, side and end walls and a lid hinged to the upper edge of one side wall, a burner arranged within and supported by the casing, a supporting frame pivoted to the outer edge of said lid and adapted to support the lid in a plane with the upper edges of said casing end and sides when the lid is moved to open position, and a combined wind shield and warming oven comprising a back and sides hinged to the back and being detachably supported by said lid and by the upper edges of said casing end walls.

8. A portable stove comprising a casing having a bottom, side and end walls and a lid, a fuel tank, a vapor generating burner, straps connecting the burner with the fuel tank to form a unitary structure movable as a unit from a position in which both the burner and tank lie wholly within the casing to a position in which the burner lies wholly within and below the plane of the upper edges of said casing walls and the tank lies outside of the casing with the straps resting on an edge of a wall of the casing, the casing being provided with means for securely holding said unitary structure in its said alternate positions.

9. A portable stove comprising a casing having a bottom provided with openings for air to support combustion and having side and end walls and a lid, legs attached to the casing for holding its bottom above a support whereby air may flow through said bottom openings when the stove is in use, a fuel tank, a vapor generating burner, and means connecting said burner with said tank to form a unitary structure movable as a unit from a position in which both the burner and tank lie wholly within the casing to a position in which the burner lies wholly within and below the plane of the upper edges of the casing walls and the tank lies outside of the casing and above the plane of the lower ends of said legs, said connecting means engaging said casing for holding said unitary structure in the second of its said alternate positions.

10. A portable stove comprising a casing having a bottom provided with openings for air to support combustion and having side and end walls and a lid, legs attached to the casing for holding its bottom above a support whereby air may flow through said bottom openings when the stove is in use, a fuel tank, a vapor generating burner, and straps connecting the burner with the fuel tank to form a unitary structure movable as a unit from a position in which both the burner and tank lie wholly within the casing to a position in which the burner lies wholly within and below the plane of the upper edge of the casing walls and the tank lies outside of the casing with said straps resting on an edge of a wall of the casing, said straps holding said tank above the plane of the lower ends of said legs when said unitary structure is in the second of its said alternate positions.

11. A portable stove comprising a casing having bottom, side and end walls and a lid, a vapor-generating burner, a pair of spaced apart straps connected to said burner, said straps being bent downwardly to form casing-engaging seats intermediate their ends and tank-supporting terminals, a fuel tank rigidly connected to said terminals, a pipe connecting said burner and tank and provided with a valve having an operating member for controlling flow through the pipe, said burner, tank, straps and pipe forming a self-contained unit movable as an entity from an inoperative position in which it lies wholly within the casing to an operative position in which the burner lies wholly within and below the plane of the upper edges of said casing walls and the tank and valve operating member lie outside of the casing, the said casing-engaging seats cooperating with the upper edge of one of the casing walls and the said tank being disposed adjacent the casing wall and below its upper edge when said unit is moved to its said operative position.

In testimony whereof, we hereunto sign our names.

FRED G. KLINERT.
RENE T. HUGO.

Witnesses:
MARJORIE J. STEELE,
E SEGERMAN.